United States Patent [19]

Groene

[11] 4,239,430
[45] Dec. 16, 1980

[54] JACK AND TIE-DOWN SYSTEM FOR A VEHICLE MOUNTED CARGO UNIT

[76] Inventor: Richard L. Groene, 1800 Fuller Rd., West Des Moines, Iowa 50265

[21] Appl. No.: 58,482

[22] Filed: Jul. 18, 1979

[51] Int. Cl.³ .............................................. B60P 3/32
[52] U.S. Cl. ..................................... 410/68; 254/45; 296/167; 280/638; 414/498
[58] Field of Search ........................ 414/498; 280/638; 254/45; 296/167; 410/68

[56] References Cited

U.S. PATENT DOCUMENTS

| | | | |
|---|---|---|---|
| 2,088,430 | 7/1937 | Nelles | 104/123 |
| 3,698,758 | 10/1972 | Dojgen | 296/167 |

Primary Examiner—Richard A. Bertsch
Attorney, Agent, or Firm—Rudolph L. Lowell; G. Brian Pingel

[57] ABSTRACT

A jack and tie-down system for the front end of a vehicle mounted box shaped cargo unit having a front wall and a transversely extended chamber means secured to the inner surface thereof. A pair of front jack assemblies each includes a horizontal support structure guidably mounted within the chamber means for movement from a storage position in the chamber means to an operating position projected outwardly from an associated end of the chamber means. A linearly extendible and retractible jack unit is releasably mounted at the outer end of each projected support member for adjustment into and out of ground engagement. When the cargo unit is to be transported the jack units are retracted and detached from their associated support members. Each jack unit is then received within a support member, and the resulting assembly stored in the chamber means within the transverse confines of the cargo unit. Coacting lock means on the cargo unit and vehicle body releasably lock the cargo unit to the vehicle body in response to movement of one of the support structures from the operating position therefor to its storage position.

5 Claims, 5 Drawing Figures

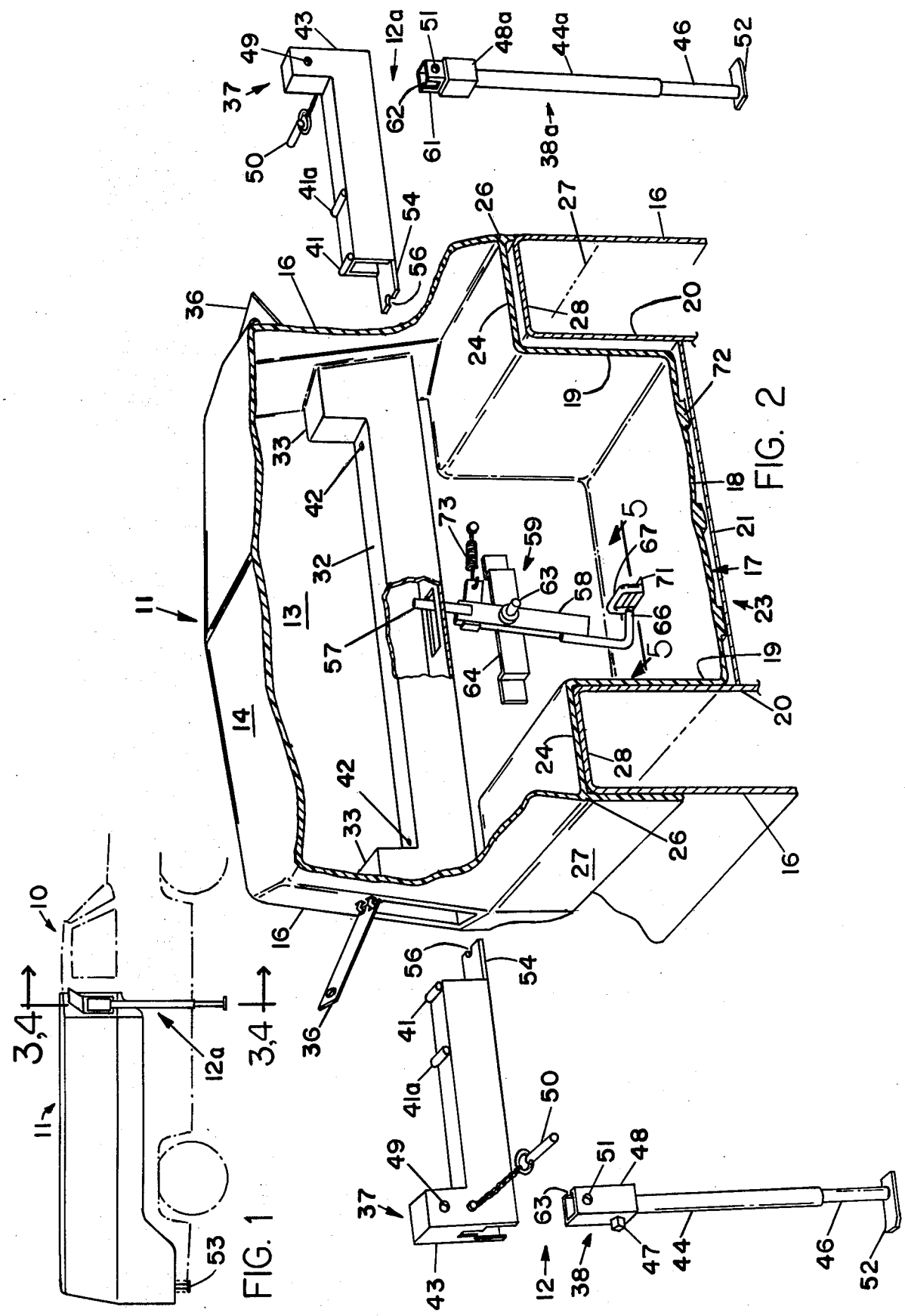

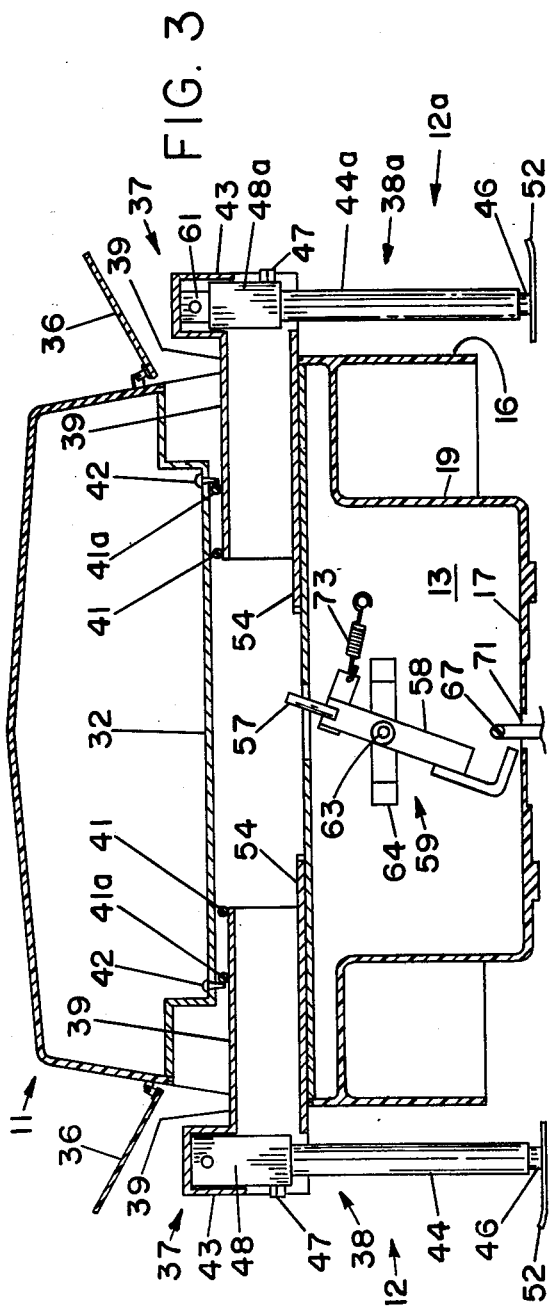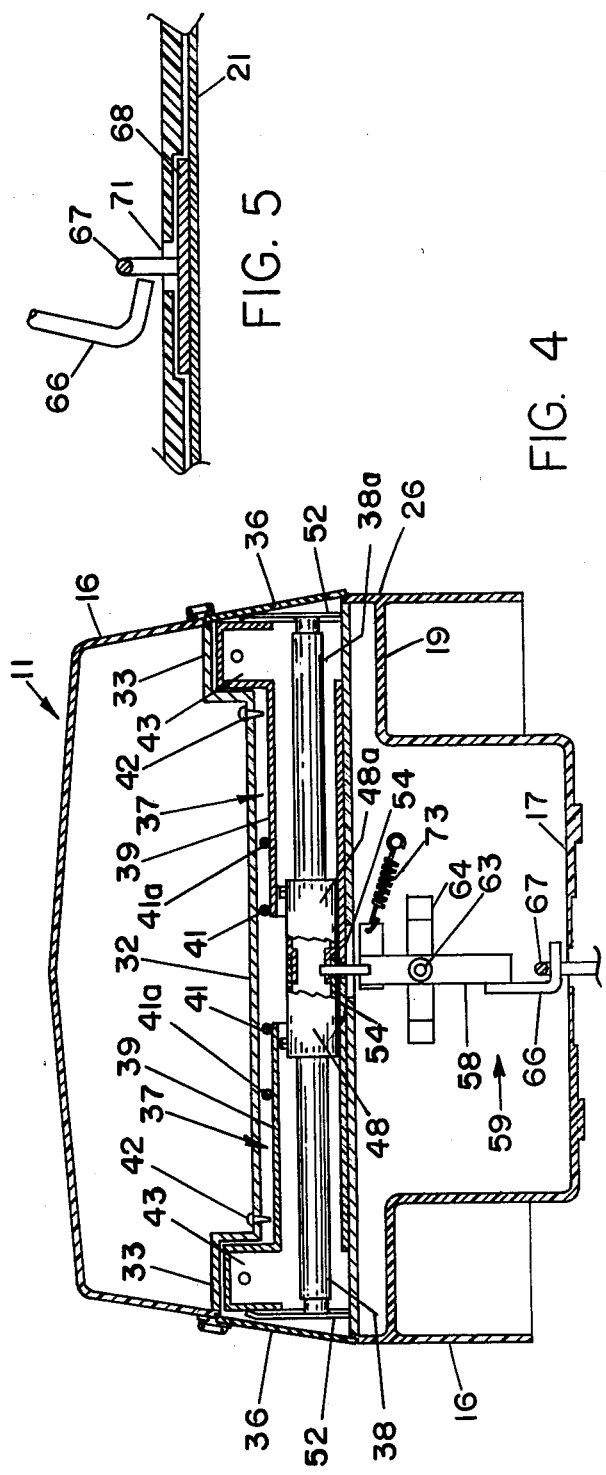

JACK AND TIE-DOWN SYSTEM FOR A VEHICLE MOUNTED CARGO UNIT

BACKGROUND OF THE INVENTION

Jack and tie-down systems for vehicle mounted camper units and cargo units generally include front and/or rear jack units which in transport remain exposed for coaction with a portion of the vehicle for tie-down purposes. Such systems are shown, for example, in U.S. Pat. Nos. 3,532,236, 3,580,599, 3,415,490; 3,698,758 and 4,044,999. The exposed jack units, in vehicle travel, detract from the overall appearance of the vehicle-cargo unit assembly; are subject to being damaged and frequently cause personal injury by being inadvertently walked into or bumped against. The tie-down structure, when exposed, is subject to weather and road conditions and resultant wear and inconvenient manipulation.

SUMMARY OF THE INVENTION

The front jack and tie-down system of this invention is of a simple and rugged construction and readily manipulated for movement to operating and storage positions. In their operating positions a pair of transversely opposite front jack assemblies each includes a jack unit located outwardly from an adjacent side of the vehicle to provide free movement of the vehicle relative to the cargo unit, either when the cargo unit is to be self-supported on the ground, or vehicle mounted. The jack assemblies are of a knock-down construction so that when the cargo unit is vehicle mounted the jack assemblies are stored within the dimensional confines of the storage chamber. The jack assemblies on movement to their storage positions automatically actuate a tie-down system to releasably lock the front end of the cargo unit to the vehicle. The tie-down system is released simultaneously with the movement of the jack assemblies from their storage positions to the operating positions therefor. The jack assemblies are thus readily available for operating purposes and are completely removed from view in transport for coaction with a tie-down system that is not exposed to either the weather or road conditions.

BRIEF DESCRIPTION OF THE DRAWINGS

FIG. 1 is a diagrammatic showing of the cargo unit mounted on the vehicle with the front jack assemblies illustrated in retracted operating positions;

FIG. 2 is an enlarged exploded detail view of the front portion of the cargo unit and a portion of the vehicle body showing the front pair of jack assemblies removed from the storage compartment therefor and the vehicle tie-down for the front end of the cargo unit in a released position;

FIG. 3 is an enlarged sectional view taken on the line 3—3 in FIG. 1 showing the jack assemblies in retracted operating positions and the vehicle tie-down assembly in a released position;

FIG. 4 is illustrated similarly to FIG. 3 and shows the jack assemblies knocked down and in storage positions and the vehicle tie-down system in a cargo unit locking position; and FIG. 5 is an enlarged sectional detail view taken on the line 5—5 of FIG. 2 showing the vehicle tie-down system in a released position.

DESCRIPTION OF THE INVENTION

Referring to the drawings, there is illustrated in FIG. 1 a vehicle 10 of a type generally referred to as a pickup truck shown in assembly relation with the cargo unit 11 and front jack and tie-down system of this invention. The front jack assemblies 12 and 12a are illustrated in their retracted operating positions, with only one of such jack assemblies being shown in FIG. 1.

The cargo unit 11 (FIGS. 1 and 2) is of an integral fiberglass construction and of a generally rectangular box shape including a front wall 13, a top wall 14, side walls 16 and a bottom wall 17. The bottom wall 17 (FIG. 2) is of a generally U-shape in transverse cross section having a base section 18 and leg sections 19 relatively formed for reception in a nested relation within the bed 21 and side wall structures 20 respectively, of the vehicle body structure 23. Each leg section 19 terminates in an outwardly projected lateral section 24, the terminal end 26 of which is joined to a side wall 16 of the cargo unit at a position spaced upwardly from the lower edge 27 of a side wall 16.

When the cargo unit 11 is received within the vehicle body 23, the lateral projections 24 are positioned adjacent to and in an overlying relation with the upper sides 28 of the double walled side wall structures 20 of the vehicle body 23. In this respect, it is seen that when the cargo unit 11 is located within the vehicle body 23 the portions of the cargo unit side walls 16, below the junctions 26, and the leg sections 19 of the bottom wall 17 are arranged in a straddling relation with the side wall structures 20 of the vehicle body 23.

Extended transversely over the entire width of the cargo unit 11 and secured to the inner surface of the front wall 13 is an elongated tubular member 32 of a generally square shape in transverse cross section having enlarged upright end sections 33 open to the respective side walls 16 of the cargo unit 11. Each end section 33 has an open side continuous with the open end of the tubular member 32 for a purpose to appear later. The open side of each end section 33 is provided with a hinged door 36 which, in a closing position, lies substantially within the plane of an associated side wall 16 of the cargo unit 11. The tubular member 32 and the end sections 33 form a storage chamber for the jack assemblies 12 and 12a when the cargo unit 11 is in transit.

The jack assemblies 12 and 12a are of what might be called a knock-down construction and each is comprised of a supporting arm structure 37 and jack units 38 and 38a, respectively. Since each supporting arm structure 37 is similar in construction and operation, only one thereof will be described in detail with like numbers being applied to like parts.

A supporting arm structure 37 (FIGS. 2 and 3) includes a tubular body member 39 of a rectangular shape in transverse cross section and of a size to be received in a telescopic relation within the storage chamber 32 through an associated end section 33. Each supporting arm structure 37 is movable from a storage position (FIG. 4) located within the chamber 32 to an operating position extending outwardly from an end section 33 (FIG. 3). Movement of the supporting arm structure 37 between such two positions therefor is facilitated by transversely extended combination bearing and guide rods 41 and 41a, that are secured in a longitudinally spaced relation to the upper surface of a tubular member 39 for contact engagement with the inner surface, of the top side of the tubular member 32. Extension of a supporting arm structure 37 to the operating position therefor is limited by the engagement of the guide rod 41a with an abutment 42, illustrated in FIGS. 3 and 4 as a screw member, which is secured to and projects downwardly from the top side of the tubular member 32. The outer end of each arm structure 37 is integrally formed with an upright socket portion 43 which, when a jack assembly 12 and 12a is to be stored, is received within a corresponding end section 33 of the tubular member or storage chamber 32.

When the jack assemblies 12 and 12a are to be used for elevating the cargo unit 11 relative to the vehicle body 23, for mounting or dismounting purposes relative to the vehicle 10, each jack unit 38 and 38a is connected in a suspended relation from the socket portions 43 of the support structures 37. Each jack unit 38 and 38a includes a cylindrical body member 44 and 44a, respectively, in operative association with an extendible and retractible screw member 46. Retraction and extension of the screw member 46 is accomplished in a usual manner by a turn screw 47 which is manually actuated by a detachable crank (not shown).

For connecting each jack unit 38 and 38a in a suspended relation from an associated socket portion 43, the upper ends of the body members 44 and 44a are provided with plug units 48 and 48a, respectively, for reception within a socket portion 43. This connection is maintained by a locking pin 50 (FIG. 2) insertable within aligned openings 49 and 51 formed, respectively, in the socket portions 43 and plug units 48 and 48a. On manipulation of the turn screws 47 the screw members 46 are extendible and retractible relative to the cylindrical body members 44 and 44a. On extension of the jack units 38 and 38a foot plates 52 on the screw members 46 are initially engageable with the ground, after which the cargo unit 11 is raised from the vehicle body 23. It is to be understood that rear jack assemblies, only one of which is indicated generally at 53 in FIG. 1, would be used in conjunction with the front jack assemblies 12 and 12a for ground support of the cargo unit 11 independently of the vehicle 10.

Let it be assumed that the cargo unit 11 is in a ground supported position and that the vehicle 10 has been moved thereunder so that the cargo unit 11 is receivable within the vehicle body 23. The rear jack assemblies 53, which may be mounted on the vehicle body 23, are retracted to the transport positions therefor. Likewise, the screws 46 of the jack units 38 and 38a are fully retracted within their associated body members 44 and 44a. The locking pins 50 are then removed to permit the detachment of the jack units from their corresponding supporting arm structures 37. Each locking pin 50 is chained to a corresponding support structure 37 so as to be conveniently available at all times. With the jack units 38 and 38a detached, the support structures 37 are manually moved inwardly toward each other to positions within the storage chamber or tubular body member 32 wherein each socket portion 43 is located within a corresponding end section 33 of the tubular member 32.

As shown in FIGS. 2 and 3, the lower wall of each body member 39 of a supporting arm structure 37 has an inwardly projected longitudinal extension 54 the free edge of which is formed with a central notch 56. When the support structures 37 are within the longitudinal confines of the tubular member 32, the adjacent free edges of the extensions 54 may be in contact engagement so that the notches 56 coact to form a substantially circular opening for the upper end 57 of a pivoted latch member 58 that forms part of the cargo unit front tie-down structure, indicated generally at 59.

As seen in FIG. 4, the jack units 38 and 38a are of a longitudinal length greater than their associated support structures 37 such that when the jack units and support structures 37 are in relative telescopic relations within the storage member 32, the plug units 48 and 48a project outwardly from the inner ends of corresponding support structures 37. To assure the reception of the latch end 57 within the notches 56 of the extensions 54, the plug unit 48a of the jack unit 38a (FIGS. 2 and 3) has the outer end thereof of a reduced section 61 for reception within the adjacent end of the plug unit 48 of the jack unit 38. The lower side of the reduced section 61 and the lower side of the plug unit 48 are notched, as indicated at 62 and 63, respectively, to permit extension therethrough of the latch upper end 57 when the jack units are in their innermost positions within the tubular member 32.

With reference to FIG. 4, therefore, it is seen that the supporting arm structures 37 are in their innermost positions when the socket portions 43 thereof are within the end sections 33, and that the innermost positions of the jack units 38 and 38a are defined when the adjacent free edges of the extensions 54 are contiguous. When this relation occurs, the foot plates 52 are positioned within the tubular member 32 in engagement with the socket portions 43 on the support structures 37. On closing of the hinged doors 36, to closing positions relative to the open ends of the tubular member 32 the jack assemblies 12 and 12a are completely enclosed so as to give an overall clean cut appearance to the cargo unit 11.

Simultaneously with the storage of the jack assemblies 12 and 12a within the storage chamber 32, the tie-down structure 59 is actuated to a position for locking the front end of the cargo unit 11 to the vehicle body 23. Referring to FIGS. 2 and 4, the latch member 58 is pivoted intermediate its ends at 63 to a bracket member 64 fixed to the inner surface of the front wall 13 of the cargo unit 11. The latch member 58 is pivotally movable in a plane extended transversely of the cargo unit.

The lower end of the latch member 58 is of a generally angulate form having a hook latch portion 66 movable into and out of engagement with an upright hasp or catch member 67 carried on a plate member 68 which is secured to the bed 21 of the vehicle body 23 (FIGS. 2 and 5). When the cargo unit is received within the vehicle body 23, the hasp 67 projects upwardly from the bottom wall 17 of the cargo unit 11 through an opening 71. To accommodate the plate member 68, the bottom wall 17 of the cargo unit 11 is integrally formed on its bottom surface with transversely spaced longitudinally extended brace ribs 72. With the plate member 68 received within the confines of the vertical height of the ribs the cargo unit is in a firmly supported position on the bed 21 of the vehicle body.

When the supporting arm structures 37 are moved away from each other from their positions in FIG. 4 to their positions shown in FIG. 3, the latch member 58 is actuated by a tension spring 73 to an open or release position relative to the hasp 67. Stated otherwise, the spring 73 continuously urges the latch member 58 to a release position of the hook 66. The tie-down structure 59 is thus automatically released on movement of the arm structures 37 to their positions (FIG. 3) providing for an operating connection with the jack units 38 and 38a.

On movement of the arm structures 37 to their storage positions (FIG. 4), the upper or actuating end 57 of the latch 58 is in linear alignment with the notches 56 of the extensions 54 which, on movement toward each other, engage and move the latch member 58 to the upright position therefor, shown in FIG. 4 which upright position is maintained when the latch end 57 is received within both notches 56. On movement the latch to this upright position, the hook member 66 is moved into locking engagement with the hasp member 67. Release of and locking of the tie-down structure for the cargo unit 11 is thus automatically accomplished in response to movement of the supporting arm structures 37 into and out of the storage or transit positions therefor.

Although the invention has been described with respect to a preferred embodiment thereof it is to be understood that it is not to be so limited since changes and modifications can be made therein which are within the full intended scope of this invention as defined by the appended claims.

I claim:

1. In a jack and tie-down system for a vehicle mounted cargo unit having a front wall and a bottom wall, and wherein the vehicle has opposite side walls, said system comprising:
   (a) a pair of linearly extendible and retractible front jack assemblies for supporting said cargo unit, each of which includes a support structure and a detachable jack unit;
   (b) a transversely extended open ended storage chamber means for said jack assemblies secured to the front wall of said unit,
   (c) means movably mounted each support structure within said chamber means for movement longitudinally thereof to an operating position projected outwardly from one end of said chamber means, and to a storage position within said chamber means,
   (d) coacting means at one end of each jack unit and at the outer end of an associated support structure for detachably connecting a jack unit in a suspended position when a support structure is in the operating position therefor, each jack unit, when retracted and detached from an associated support sturcture being receivable within said support structure for movement therewith to said storage position,
   (e) means on said cargo unit for releasably locking said cargo unit for transport with said vehicle including a latch member having an actuator portion projected within said chamber means, and
   (f) means for yieldably urging said latch member to a release position of said locking means,
   (g) said actuator portion, on movement of the support structures to the storage positions therefor, being engageable by at least one of said support structures for movement against the action of said yieldable means to a lock position of said locking means.

2. The jack and tie-down system according to claim 1 including:
   (a) coating stop means on each support structure and on said chamber means for limiting the outward movement of a support structure to the operating position therefor, wherein the outer end of a support structure is spaced outwardly from an adjacent side wall of said vehicle.

3. The jack and tie-down system according to claim 1 wherein:
   (a) said chamber means is positioned inwardly of said front wall and is of a rectangular shape in transverse cross section, and each support structure is of a tubular construction and of a size and shape for telescopic reception within said chamber means, and
   (b) each jack unit, when detached from an associated support structure, being receivable therein for movement therewith to the operating position and storage position therefor.

4. The tie-down and jack system according to claim 1 wherein:
   (a) said vehicle body has a floor and the bottom wall of the cargo unit an opening formed therein adjacent the forward end thereof, and
   (b) said coacting lock means includes a catch member mounted on said floor and extendible through said opening, when the cargo unit is in the transport position therefor, a pivoted upright latch member having a hook member at the lower end thereof pivotally movable into and out of engagement with said catch member, and an actuating portion at the upper end thereof projected within said chamber means,
   (c) means pivotally supporting said latch member on said front wall for pivotal movement in a path transversely of said cargo unit, and
   (d) means on said cargo unit for yieldably holding said hook member out of engagement with said catch member, said actuating portion being actuated in response to movement of at least one of said support structures from the operating position to the storage position therefor to move said hook member into engagement with said catch member.

5. A jack and tie-down system according to claim 1 wherein:
   (a) said detachable connecting means includes a downwardly facing socket portion at the outer end of each support structure, and a plug portion at the upper end of an associated jack unit receivable within said socket portion, and
   (b) means for releasably securing said plug portion within said socket portion.

* * * * *